US010926912B2

(12) United States Patent
DiBiasio

(10) Patent No.: US 10,926,912 B2
(45) Date of Patent: *Feb. 23, 2021

(54) METHOD FOR MAKING A DUAL CHAMBER BOTTLE

(71) Applicant: Silgan Plastics LLC, Chesterfield, MO (US)

(72) Inventor: Sergio DiBiasio, Etobicoke (CA)

(73) Assignee: Silgan Plastics LLC, Chesterfield, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/160,010

(22) Filed: Oct. 15, 2018

(65) Prior Publication Data

US 2019/0047202 A1    Feb. 14, 2019

Related U.S. Application Data

(63) Continuation of application No. 15/670,680, filed on Aug. 7, 2017, now Pat. No. 10,131,082, which is a
(Continued)

(51) Int. Cl.
*B65D 1/04* (2006.01)
*B65D 1/02* (2006.01)
(Continued)

(52) U.S. Cl.
CPC ............... *B65D 1/04* (2013.01); *B29C 49/22* (2013.01); *B29C 49/4273* (2013.01); *B29C 49/4278* (2013.01); *B29C 49/4802* (2013.01); *B29C 49/50* (2013.01); *B65D 1/0223* (2013.01); *B29C 2793/009* (2013.01); *B29L 2022/007* (2013.01); *B29L 2031/7158* (2013.01); *B65D 2501/009* (2013.01); *B65D 2501/0081* (2013.01)

(58) Field of Classification Search
CPC ................................ B65D 1/04; B65D 1/0215
See application file for complete search history.

(56) References Cited

U.S. PATENT DOCUMENTS 3,682,026 A    8/1972   Criss
3,967,516 A    7/1976   Griesing
(Continued)

FOREIGN PATENT DOCUMENTS

FR            2598114       11/1987
JP            07257661      10/1995
WO         WO 03029103      4/2003

*Primary Examiner* — James N Smalley
*Assistant Examiner* — Jennifer Castriotta
(74) *Attorney, Agent, or Firm* — Reinhart Boerner Van Deuren s.c.

(57) ABSTRACT

A multiple-chamber container that is extrusion blow molded with a single neck finish and a method to trim the single neck finish is provided. The physical appearance of the multiple-chamber container before the trimming process differs from the multiple-chamber container after the trimming process. The multiple-chamber container includes multiple openings that are configured to engage with a single cap after the trimming process to create a seal. The multiple-chamber container may contain different materials, such as liquids, gel-like substances, granular materials, food, etc. that are not permitted to flow from one chamber to the other chamber when the cap is engaged with the chamber openings.

14 Claims, 13 Drawing Sheets

Related U.S. Application Data continuation of application No. 14/700,870, filed on Apr. 30, 2015, now Pat. No. 9,751,248, which is a continuation-in-part of application No. 14/527,051, filed on Oct. 29, 2014, now Pat. No. 10,358,251.

(51) Int. Cl.

| | | |
|---|---|---|
| *B29C 49/22* | (2006.01) | |
| *B29C 49/50* | (2006.01) | |
| *B29C 49/42* | (2006.01) | |
| *B29C 49/48* | (2006.01) | |
| B29L 22/00 | (2006.01) | |
| B29L 31/00 | (2006.01) | |

(56) References Cited

U.S. PATENT DOCUMENTS

| | | |
|---|---|---|
| 4,680,208 A | 7/1987 | Aoki |
| 4,827,816 A | 5/1989 | Takaniemi |
| 4,894,267 A | 1/1990 | Bettie, III |
| 5,135,702 A | 8/1992 | Eales |
| 5,301,838 A | 4/1994 | Schmidt |
| 5,702,033 A * | 12/1997 | Beaver ............... B65D 35/22 222/145.3 |
| 5,730,337 A | 3/1998 | Carille et al. |
| 5,840,350 A | 11/1998 | Salerni |
| 5,954,224 A | 9/1999 | Berger |
| 5,971,197 A | 10/1999 | Everette |
| 6,022,134 A | 2/2000 | Andrews |
| 6,026,989 A | 2/2000 | Richmond |
| 6,223,943 B1 | 5/2001 | Richmond et al. |
| 6,520,378 B1 | 2/2003 | Goettner et al. |
| 6,928,913 B2 | 8/2005 | Darr |
| 6,984,119 B1 | 1/2006 | Hickman et al. |
| 6,994,821 B1 | 2/2006 | Dundas |
| 7,153,466 B2 | 12/2006 | Clougherty |
| 7,513,399 B2 | 4/2009 | Mengeu |
| 7,766,197 B2 | 8/2010 | Getsy |
| 7,918,360 B2 | 4/2011 | Mengeu et al. |
| D663,212 S | 7/2012 | DiBiasio et al. |
| D678,773 S | 3/2013 | DiBiasio et al. |
| D696,129 S | 12/2013 | DiBiasio et al. |
| D718,634 S | 12/2014 | DiBiasio et al. |
| 8,936,459 B2 | 1/2015 | Zimmer et al. |
| 9,205,991 B2 | 12/2015 | Wolff |
| D751,914 S | 3/2016 | DiBiasio |
| 9,751,248 B2 | 9/2017 | DiBiasio |
| 2002/0074347 A1 | 6/2002 | Murray |
| 2005/0133530 A1 | 6/2005 | Wichmann et al. |
| 2005/0133533 A1 | 6/2005 | Wichmann |
| 2013/0306498 A1 | 11/2013 | Azani |
| 2014/0091094 A1 * | 4/2014 | Habibi-Naini ....... B65D 81/325 220/500 |
| 2016/0122066 A1 | 5/2016 | DiBiasio |

* cited by examiner

METHOD FOR MAKING A DUAL CHAMBER BOTTLE

CROSS-REFERENCE TO RELATED PATENT APPLICATION

This application is a continuation of U.S. application Ser. No. 15/670,680 filed Aug. 7, 2017, which is a continuation of U.S. application Ser. No. 14/700,870 filed Apr. 30, 2015, now U.S. Pat. No. 9,751,248, which is a continuation-in-part of U.S. application Ser. No. 14/527,051, filed Oct. 29, 2014, which is incorporated herein by reference in its entirety.

BACKGROUND OF THE INVENTION

The present invention relates to a dual chamber extrusion blow molded container with a single neck finish in which the chambers hold a liquid, gel-like substance, granular materials, food etc. and may be sealed with a single cap. In particular, the present invention relates specifically to a container or a method which provides separation between the container chambers extending from the bottom of the container to the top of the sealing surface of the single neck finish.

SUMMARY OF THE INVENTION

One embodiment of the invention relates to a multiple-chamber container. The multiple-chamber container includes a first tapered neck portion, a first chamber, a second tapered neck portion, a second chamber, a hollow cylindrical collar and a transition portion. The first chamber includes a first bottom wall and a first side wall formed with the first bottom wall and terminating at the first tapered neck portion which defines a first opening into the first chamber. The second chamber includes a second bottom wall substantially coplanar with the first bottom wall and a second side wall formed with the second bottom wall and terminating at the second tapered neck portion which defines a second opening into the second chamber. Each neck portion includes a semi-circular shaped external surface having an external thread. The hollow cylindrical collar has a circular cross-section defining a substantially circular opening. The transition portion provides a content-tight junction between the first and second neck portions and the hollow cylindrical collar such that any content passing between either chamber and the circular opening must pass through the hollow cylindrical collar.

Another embodiment of the invention relates to a multiple-chamber container. The multiple-chamber container includes a first chamber, a second chamber, a hollow cylindrical collar and a transition portion. The first chamber includes a first bottom wall and a first side wall formed with the first bottom wall and terminating at a first tapered neck portion which defines a first opening into the first chamber, wherein the first tapered neck portion includes a first neck wall facing the second tapered neck portion. The second chamber includes a second bottom wall substantially coplanar with the first bottom wall and second side wall formed with the second bottom wall and terminating at a second tapered neck portion which defines a second opening into the second chamber. Each neck portion includes a semi-circular shaped surface having an external thread. The second tapered neck portion includes a second neck wall facing the first tapered neck portion. Each neck portion includes at least 2 ribs on the neck walls. The hollow cylindrical collar has a circular cross-section defining a substantially circular opening. The transition portion provides a content-tight junction between the first and second neck portions and the hollow cylindrical collar such that any content passing between either chamber and the circular opening must pass through the hollow cylindrical collar. The transition portion includes a plurality of cross-sectional shapes with at least one of the shapes at one of the cross-sections includes 2 opposed, hollow D-shaped surfaces. The walls, hollow cylindrical collar and transition portion being formed from 1 or more layers of thermoplastic material with each adjacent layer being different from the other.

Another embodiment of the invention relates to a method of forming a multiple-chamber container. The method of forming a multiple-chamber container includes extruding a molten plastic extrusion, closing a mold around the extrusion, forcing a gas into the extrusion and removing the hollow cylindrical collar from the neck portion. The molten plastic extrusion is formed from 1 or more different types of thermoplastic materials to produce 1 or more layers of adjacent thermoplastic materials wherein adjacent layers are different from each other. The closed mold includes an interior mold wall defining an interior shape. The gas into the extrusion is to expand the extrusion into contact with the interior mold wall to form a container having an outside shape. The outside shape of the container differing from the interior shape of the mold by an amount defined by the effects of thermal deformation occurring during the forming process. The mold includes an interior shape causing the container to include a first chamber, a second chamber, a hollow cylindrical collar and a transition portion. The first chamber includes a first bottom wall and a first side wall formed with the first bottom wall and terminating at a first tapered neck portion which defines a first opening into the first chamber. The second chamber includes a second bottom wall substantially coplanar with the first bottom wall and a second side wall formed with the second bottom wall and terminating at a second tapered neck portion which defines a second opening into the second chamber. Each neck portion includes a semi-circular shaped surface having an external thread. The hollow cylindrical collar has a circular cross-section defining a substantially circular opening. The transition portion provides a content-tight junction between the first and second neck portions and the hollow cylindrical collar such that any content passing between either chamber and the circular opening must pass through the hollow cylindrical collar. Removing the hollow cylindrical collar from the neck portion at the transition portion to produce a container having a coplanar top surface circumscribing two non-circular openings.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should be regarded as limiting.

Referring generally to the figures, in one embodiment a multiple-chamber container that is extrusion blow molded with a single neck finish and a method to trim the single neck finish is provided. The physical appearance of the multiple-chamber container before the trimming process differs from the multiple-chamber container after the trimming process. The multiple-chamber container includes multiple openings that are configured to engage with a single cap after the trimming process to create a seal. The multiple-chamber container may contain liquids, granular materials, gel-like substances, food, etc. that are not permitted to flow from one chamber to the other chamber when the cap is engaged with the chamber openings. The multiple-chamber container may contain different substances in each chamber. For example, one chamber may contain a liquid substance and the second chamber may include a dry product, such as a granular material.

Figure 1:
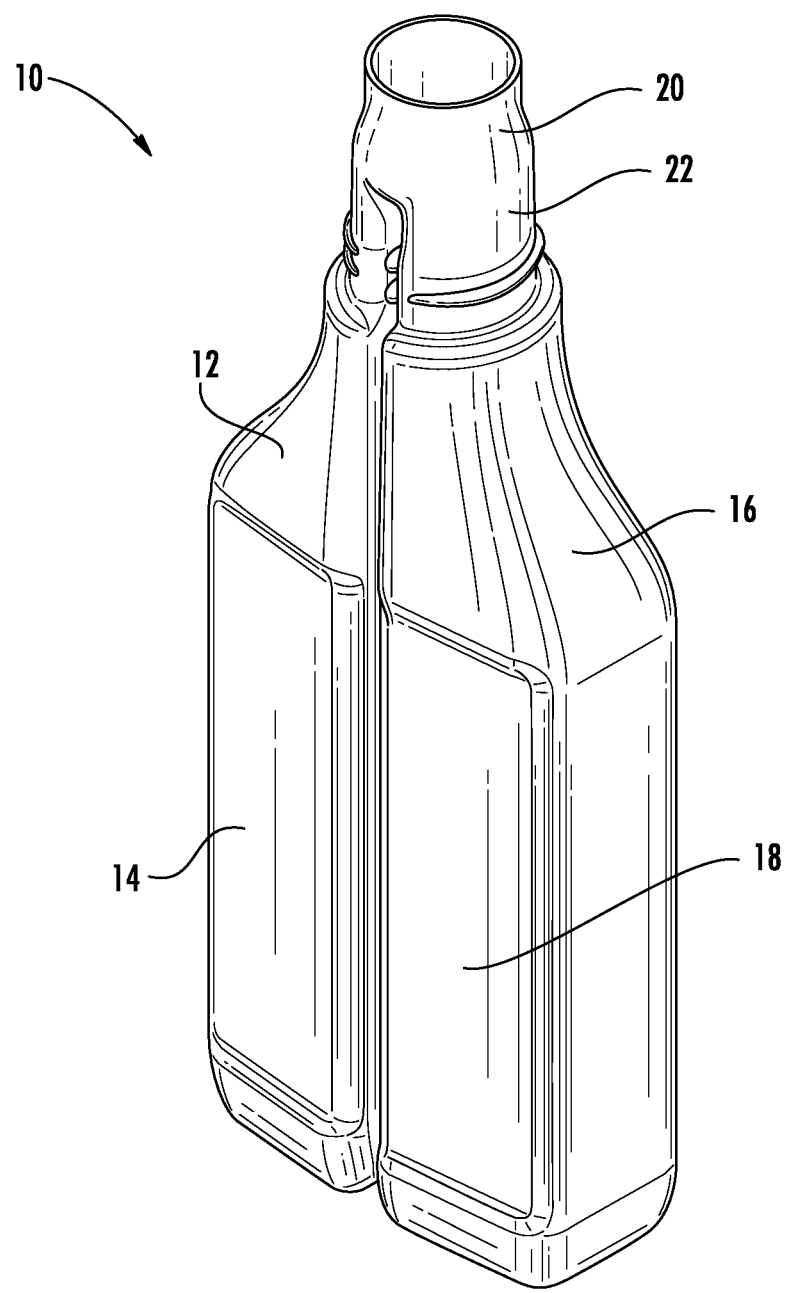
FIG. 1 is a perspective view of a multiple-chamber container before a trimming process according to an exemplary embodiment.

FIG. 1 illustrates an embodiment of a molded multiple-chamber container 10 before a trimming process (shown in FIGS. 8A-8C and FIGS. 9A-9D). The trimming processes will be discussed in detail below. The multiple-chamber container 10 includes a first tapered neck portion 12, a first chamber 14, a second tapered neck portion 16, a second chamber 18, a hollow cylindrical collar 20, a transition portion 22 and a bridge 36 (shown in FIG. 2). The multiple-chamber container 10 is molded, all or in part, of plastic (e.g., blow molded from a thermoplastic such as polyethylene).

Figure 2:
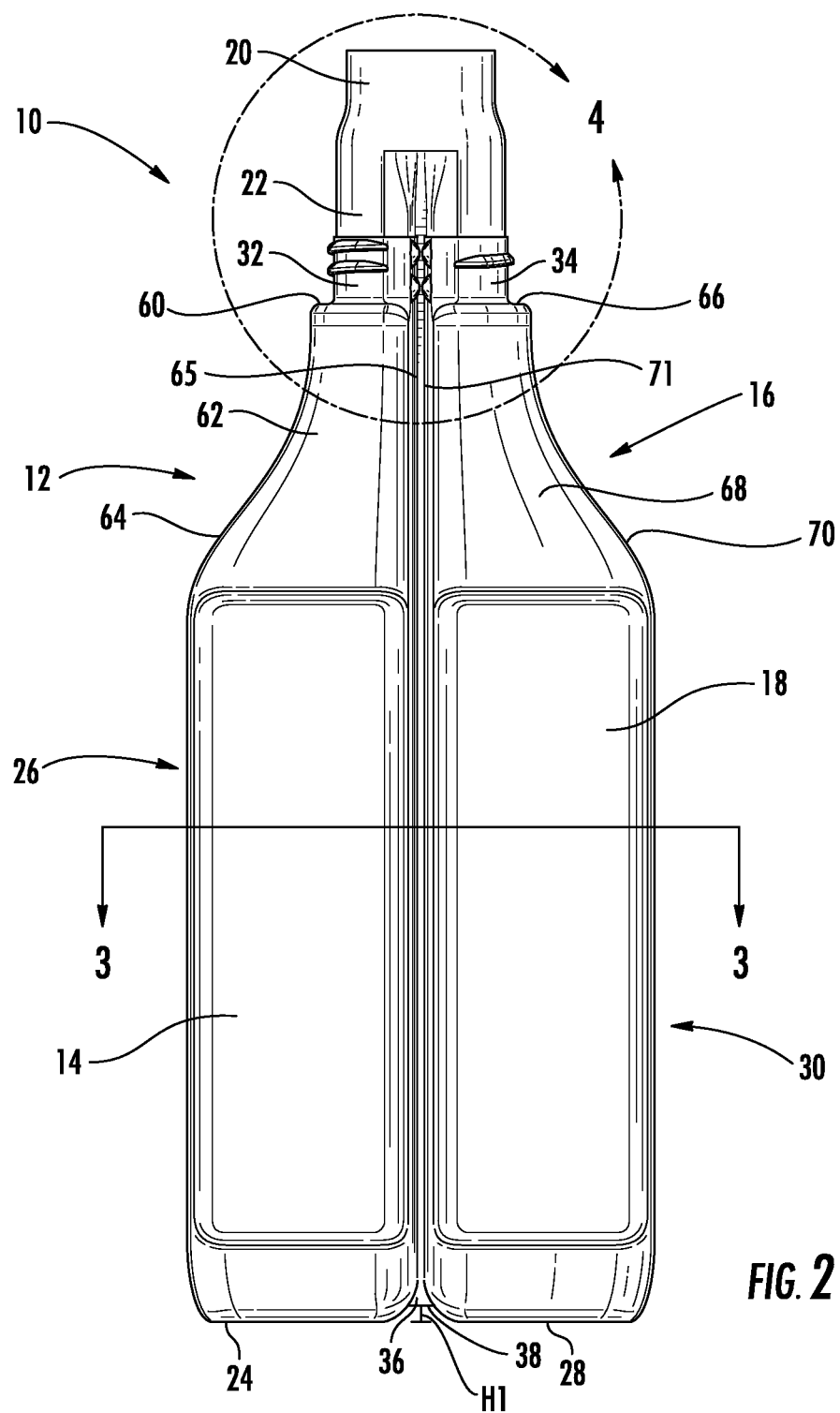
FIG. 2 is a front view of the multiple-chamber container of FIG. 1 before the trimming process according to the exemplary embodiment.

Referring to FIG. 2, the first chamber 14 includes a first bottom wall 24 that is integrally formed with a first side wall 26. The second chamber 18 includes a second bottom wall 28 that is integrally formed with a second side wall 30. The first side wall 26 extends upwards, away from the first bottom wall 24 and terminates at the first tapered neck portion 12. The second side wall 30 extends upwards, away from the second bottom wall 28 and terminates at the second tapered neck portion 16. The second bottom wall 28 is substantially coplanar with the first bottom wall 24. In the exemplary embodiment, the first chamber 14 and the second chamber 18 are mirror images of each other. In other embodiments, the first chamber 14 and the second chamber 18 may have different dimensions.

Referring to FIG. 2, the first tapered neck portion 12 extends upwards from the first side wall 26 towards a first threaded portion 32. The second tapered neck portion 16 extends upwards from the second side wall 30 towards a second threaded portion 34. The first threaded portion 32 and the second threaded portion 34 are adjacent to the transition portion 22. The transition portion 22 is generally annular in shape extending from the first threaded portion 32 and the second threaded portion 34 towards the hollow cylindrical collar 20. In the exemplary embodiment, the first tapered neck portion 12 between the first chamber 14 and the first threaded portion 32 is a mirror image of the second tapered neck portion 16 between the second chamber 18 and the second threaded portion 34. In other embodiments, the first tapered neck portion 12 between the first chamber 14 and the first threaded portion 32 may have different dimensions than the second tapered neck portion 16 between the second chamber 18 and the second threaded portion 34.

Referring to FIG. 2, the first tapered neck portion 12 includes the first threaded portion 32, a first shoulder wall 60, a first neck front wall 62, a first neck back wall (not visible in figure), a first neck side wall 64, a first neck front channel wall 65 and a first neck back channel wall (not visible in figure). The first neck front wall 62, the first neck back wall, the first neck side wall 64, first neck front channel wall 65 and the first neck back channel wall are integrally formed with each other and are adjacent to the first side wall 26 of the first chamber 14. The first neck front wall 62, the first neck side wall 64, the first neck back wall, the first neck front channel wall 65 and the first neck back channel wall extend from the first chamber 14 towards the first shoulder wall 60. The first neck side wall 64 tapers the first tapered neck portion 12, extending from the first side wall 26 at an angle upward towards the bridge 36. Therefore, the length of the first neck front wall 62 and the first neck back wall is greater near the first chamber 14 than the length near the first shoulder wall 60. The distance of the first neck side wall 64 between the first neck front wall 62 and the first neck back wall is substantially the same from the first chamber 14 to the first shoulder wall 60. In the exemplary embodiment, the first neck front wall 62 is substantially parallel with the first neck back wall extending between the first chamber 14 and the first shoulder wall 60. In other embodiments, the first neck front wall 62 and the first neck back wall may be angled, therefore, the distance between the first neck front wall 62 and the first neck back wall may vary between the first chamber 14 and the first shoulder wall 60. For example, the distance between the first neck front wall 62 and the first neck back wall may decrease as the first neck side wall 64 extends from the first chamber 14 to the first shoulder wall 60, therefore the length of the first neck side wall 64 decreases as the first neck side wall 64 extends from the first chamber 14 to the first shoulder wall 60.

Referring to FIG. 2, the second tapered neck portion 16 includes the second threaded portion 34, a second shoulder wall 66, a second neck front wall 68, a second neck back wall (not shown), a second neck side wall 70, a second neck front channel wall 71 and a second neck back channel wall (not shown). The second neck front wall 68, the second neck back wall, the second neck side wall 70, the second neck front channel wall 71 and the second neck back channel wall are integrally formed with each other and are adjacent to the second side wall 30 of the second chamber 18. The second neck front wall 68, the second neck side wall 70, the second neck back wall, the second neck front channel wall 71 and the second neck back channel wall extend from the second chamber 18 towards the second shoulder wall 66. The second neck side wall 70 tapers the second tapered neck portion 16, extending from the second side wall 30 at an angle upwards toward the bridge 36. Therefore, the length of the second neck front wall 68 and the second neck back wall is greater near the second chamber 18 than the length near the second shoulder wall 66. The distance of the second neck side wall 70 between the second neck front wall 68 and the second neck back wall is substantially the same from the second chamber 18 to the second shoulder wall 66. In the exemplary embodiment, the second neck front wall 68 is substantially parallel with the second neck back wall extending between the second chamber 14 and the second shoulder wall 66. In other embodiments, the second neck front wall 68 and the second neck back wall may be angled, therefore, the distance between the second neck front wall 68 and the second neck back wall may vary between the second chamber 18 and the second shoulder wall 66. For example, the distance between the second neck front wall 68 and the second neck back wall may decrease as the second neck side wall 70 extends from the second chamber 18 to the second shoulder wall 66, therefore the length of the second neck side wall 70 decreases as the second neck side wall 70 extends from the second chamber 18 to the second shoulder wall 66.

Referring to FIG. 2, the bridge 36 separates the first chamber 14 and the second chamber 18. The bridge 36 separates the first tapered neck portion 12 and the second tapered neck portion 16. The bridge 36 is a portion of the first side wall 26 and a portion of the second side wall 30 near the center of the multiple-chamber container 10 that is common to both the first side wall 26 and the second side wall 30. The bridge 36 extends from the transition portion 22 down towards the first bottom wall 24 and the second bottom wall 28. The bridge 36 includes a bottom surface 38 that extends between the first chamber 14 and the second chamber 18. The bottom surface 38 is parallel with the first bottom wall 24 and the second bottom wall 28. In the exemplary embodiment, the bottom surface 38 is non-planar with the first bottom wall 24 and the second bottom wall 28. The multiple-chamber container 10 has a distance H1 between the first bottom wall 24 and the second bottom wall 28 and the bottom surface 38 of the bridge 36. In other embodiments, the bottom surface 38 may be coplanar with the first bottom wall 24 and the second bottom wall 28.

Figure 3:
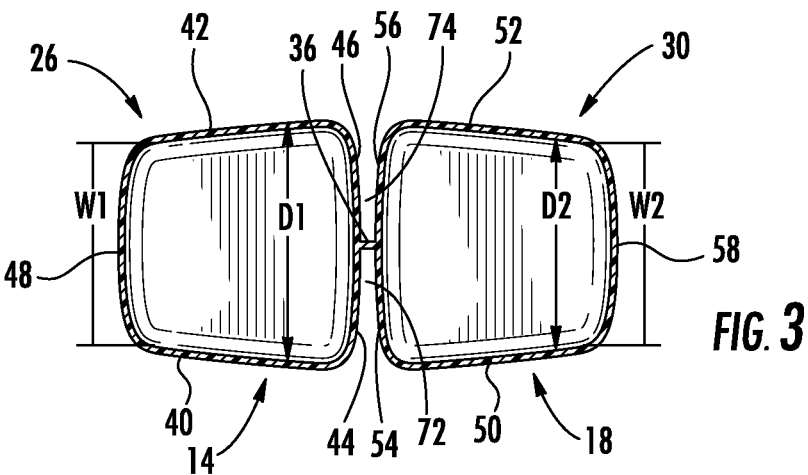
FIG. 3 is a cross-sectional view of the multiple-chamber container of FIG. 1 taken along line 3-3 in FIG. 2 according to an exemplary embodiment.

Referring to FIG. 3, the first side wall 26 includes a first front wall 40, a first back wall 42, a first front channel wall 44, a first back channel wall 46, a left side wall 48 and has a width W1 extending between the first front wall 40 and the first back wall 42. The first front wall 40, the first back wall 42, the first front channel wall 44, the first back channel wall 46 and the left side wall 48 of the first chamber 14 are adjacent to the first neck front wall 62, the first neck back wall, the first neck front channel wall 63, the first neck back channel wall and the first neck side wall 64 of the first tapered neck portion 12, respectively. The first front wall 40 extends from the left side wall 48 towards the first front channel wall 44 at an angle approximately greater than 90°. The first back wall 42 extends from the left side wall 48 towards the first back channel wall 46 at an angle approximately greater than 90°. The first front channel wall 44 extends from the first front wall 40 towards the bridge 36 at angle approximately greater than 90°. The first back channel wall 46 extends from the first back wall 42 towards the bridge 36 at an angle approximately greater than 90°. The left side wall 48, the first front wall 40, the first back wall 42, the first front channel wall 44 and the first back channel wall 46 form a hollow rectangular cross-section that extends between the first bottom wall 24 and the first tapered neck portion 12. In other embodiments, the walls of the first chamber 14 may have cross-sections that are more square or oval in shape. In other embodiments, the cross-section of the first chamber 14 may vary in shapes. For example, the first chamber 14 may have a rectangular cross-section near the first bottom wall 24 and transitions into more of a square cross-section near the first tapered neck portion 12.

Referring to FIG. 3, the first front wall 40 and the first back wall 42 have a distance D1. The distance D1 adjacent to the left side wall 48 is substantially similar to the width W1. The distance D1 increases as the first front wall 40 and the first back wall 42 extend away from the left side wall 48 towards the first front channel wall 44 and the first back channel wall 46, respectively. For example, the width W1 of the left side wall 48 may be approximately 3.5 cm and the distance D1 between the first front wall 40 and the first back wall 42 may be 3.5 cm or slightly greater, e.g., 3.55 cm, and the distance D1 between the first front wall 40 and the first back wall 42 towards the first front channel wall 44 and the first back channel wall 46 may be approximately 3.8 cm. In other embodiments, the distance D1 between the first front wall 40 and the first back wall 42 may be substantially similar from the left side wall 48 extending the entire way to the first front channel wall 44 and the first back channel wall 46. In other embodiments, the distance D1 between the first front wall 40 and the first back wall 42 may be substantially similar towards the left side wall 48 and the first front channel wall 44 and first back channel wall 46, but with varying distances in between the left side wall 48 and the first front channel wall 44 and the first back channel wall 46.

Referring to FIG. 3, the second side wall 30 includes a second front wall 50, a second back wall 52, a second front channel wall 54, a second back channel wall 56, a right side wall 58 and has a width W2 extending between the second front wall 50 and the second back wall 52. The second front wall 50, the second back wall 52, the second front channel wall 54, the second back channel wall 56 and the right side wall 58 of the second chamber 18 are adjacent to the second neck front wall 68, the second neck back wall, the second neck front channel wall 71, the second neck back channel wall and the second neck side wall 70 of the second tapered neck portion 16, respectively. The second front wall 50 extends from the right side wall 58 towards the second front channel wall 54 at an angle approximately greater than 90°. The second back wall 52 extends from the right side wall 58 towards the second back channel wall 56 at an angle approximately greater than 90°. The second front channel wall 54 extends from the second front wall 50 towards the bridge 36 at an angle approximately greater than 90°. The second back channel wall 56 extends from the second back wall 52 towards the bridge 36 at an angle approximately greater than 90°. The right side wall 58, the second front wall 50, the second back wall 52, the second front channel wall 54, the second back channel wall 56 form a hollow rectangular cross-section that extends between the second bottom wall 28 to the second tapered neck portion 16. In other embodiments, the walls of the second chamber 18 may have cross-sections that are more square or oval in shape. In other embodiments, the cross-section of the second chamber 18 may vary in shapes. For example, the second chamber 18 may have a rectangular cross-section near the second bottom wall 28 and transitions into more of a square cross-section near the second tapered neck portion 16.

Referring to FIG. 3, the second front wall 50 and the second back wall 52 have a distance D2. The distance D2 adjacent to the right side wall 58 is substantially similar to the width W2. The distance D2 increases as the second front wall 50 and the second back wall 52 extend away from the right side wall 58 towards the second front channel wall 54 and the second back channel wall 56, respectively. For example, the width W2 of the right side wall 58 may be approximately 3.5 cm and the distance D2 between the second front wall 50 and the second back wall 52 may be 3.5 cm or slightly greater, e.g., 3.55 cm, and the distance D2 between the second front wall 50 and the second back wall 52 towards the second front channel wall 54 and the second back channel wall 56 may be approximately 3.8 cm. In other embodiments, the distance D2 between the second front wall 50 and the second back wall 52 may be substantially similar from the right side wall 58 extending the entire way to the second front channel wall 54 and the second back channel wall 56. In other embodiments, the distance D2 between the second front wall 50 and the second back wall 52 may be substantially similar towards the right side wall 58 and the second front channel wall 54 and second back channel wall 56, but with varying distances in between the right side wall 58 and the second front channel wall 54 and the second back channel wall 56.

Referring to FIG. 3, the first front channel wall 44, the bridge 36 and the second front channel wall 54 form a front channel 72. The front channel 72 forms a gap that separates the first chamber 14 and the second chamber 18 between the first front wall 40 and the second front wall 50. The front channel 72 extends from the transition portion 22 to the first bottom wall 24 and the second bottom wall 28 and also separates the first tapered neck portion 12 and the second tapered neck portion 16 between the first neck front wall 62 and the second neck front wall 68 (shown in FIG. 2). The first back channel wall 46, the bridge 36 and the second back channel wall 56 form a rear channel 74. The rear channel 74 forms a gap that separates the first chamber 14 and the second chamber between the first back wall 42 and the second back wall 52. The rear channel 74 extends from the transition portion 22 to the first bottom wall 24 and the second bottom wall 28 and also separates the first tapered neck portion 12 and the second tapered neck portion 16 between the first neck back wall and the second neck back wall (not shown). The front channel 72 is located approximately 180° from the rear channel 74. In the exemplary embodiment, the front channel 72 and the rear channel 74 are mirror images of each other. In other embodiments, the front channel 72 and the rear channel 74 may have different dimensions. For example, the front channel 72 may have a greater distance between the first front wall 40 and the second front wall 50 than the distance between the first back wall 42 and the second back wall 52.

Figure 4:
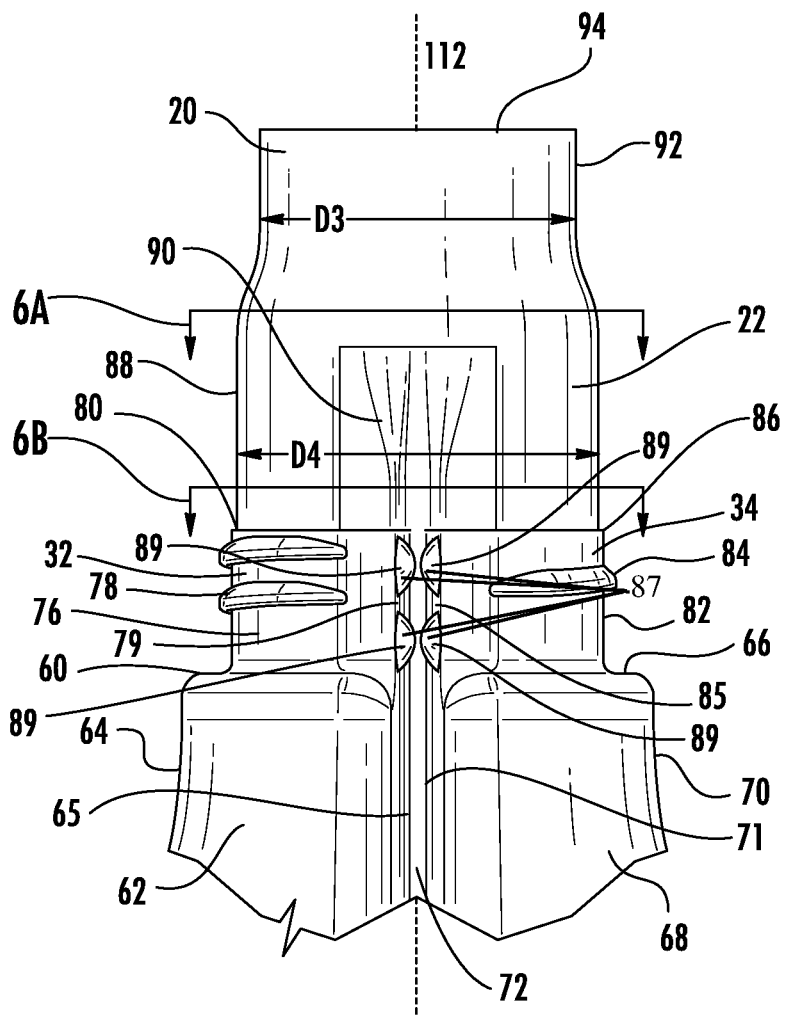
FIG. 4 is a detailed view of the area of the multiple-chamber container labeled as 4 in FIG. 2 according to an exemplary embodiment.

Referring to FIG. 4, the first shoulder wall 60 extends horizontally inwards from the first neck front wall 62, the first neck side wall 64, the first neck back wall, the first neck front channel wall 65 and the first neck back channel wall towards the first threaded portion 32. The first shoulder wall 60 is generally perpendicular to the first neck side wall 64, first neck front wall 62, the first neck back wall, the first neck front channel wall 65 and the first neck back channel wall. The first shoulder wall 60 is generally parallel with the first bottom wall 24 (shown in FIG. 2). The first shoulder wall 60 is semi-circular in shape that extends approximately 180° from the front channel 72 towards the first neck side wall 64 to the rear channel 74 (not visible in figure). The second shoulder wall 66 extends horizontally inwards from the second neck front wall 68, the second neck side wall 70, the second neck back wall, the second neck front channel wall 71 and the second neck back channel wall towards the second threaded portion 34. The second shoulder wall 66 is generally perpendicular to the second neck side wall 70, second neck front wall 68, the second neck back wall, the second neck front channel wall 71 and the second neck back channel wall. The second shoulder wall 66 is generally parallel with the second bottom wall 28 (shown in FIG. 2). The second shoulder wall 66 is semi-circular in shape that extends approximately 180° from the front channel 72 towards the second neck side wall 70 to the rear channel 74 (not shown). In other embodiments the first shoulder wall 60 and the second shoulder wall 66 may extend at an angle from the first neck side wall 64 and the second neck side wall 70, respectively. In other embodiments, only one of the shoulder walls may extend at an angle towards the front channel 72 and the rear channel 74 and the other shoulder wall may extend horizontally inwards towards the front channel 72 and the rear channel 74.

Referring to FIG. 4, the first threaded portion 32 includes a first threaded wall 76 with an external surface, a first external thread 78, a first top surface 80, a first front rib wall 79 and a first rear rib wall (not visible in figure). The first threaded wall 76 extends between the first shoulder wall 60 and the first top surface 80. The first threaded wall 76 is semi-circular in shape and extends approximately 180° from the first front rib wall 79, away from the second threaded portion 34, towards the first rear rib wall. The first external thread 78 extends from the external surface of the curved portion of the first threaded wall 76. The first front rib wall 79 extends radially outwards from the bridge 36 towards the first threaded wall 76. On the opposite side of the bridge 36 from the first front rib wall 79, the first rear rib wall extends radially outwards from the bridge 36 towards the first threaded wall 76. The second threaded portion 34 includes a second threaded wall 82 with an external surface, a second external thread 84, a second top surface 86, a second front rib wall 85 and a second rear rib wall (not visible in figure). The second threaded wall 82 extends between the second shoulder wall 66 and the second top surface 86. The second threaded wall 82 is semi-circular in shape and extends approximately 180° from the second front rib wall 85, away from the first threaded portion 32, towards the second rear rib wall. The second external thread 84 extends from the external surface of the curved portion of the second threaded wall 82. The second front rib wall 85 extends radially outwards from the bridge 36 towards the second threaded wall 82. On the opposite side of the bridge 36 from the second front rib wall 85, the second rear rib wall extends radially outwards from the bridge 36 towards the second threaded wall 82.

Referring to FIG. 4, the semi-circular shaped surfaces of the first threaded wall 76 and the second threaded wall 82 are separated by the two gaps formed by the front channel 72 and the rear channel 74 (not shown in figure) and lay within a circular plane. In the exemplary embodiment, the distance between the first threaded wall 76 and the second threaded wall 82 at points 180° from each other is less than the distance between the first neck side wall 64 and the second neck side wall 70 at points 180° away from each other. For example, the distance between the first threaded wall 76 and the second threaded wall 82 at points approximately 180° from each other may be between 30-40 mm, more specifically approximately 34 mm and the distance between the first neck side wall 64 and the second neck side wall 70 at points 180° from each other may be between 40-55 mm, more specifically approximately 48 mm. In other embodiments, the distance between the first threaded wall 76 and the second threaded wall 82 180° away from each other may be substantially the same as or greater than the distance between the first neck side wall 64 and the second neck side wall 70 at points that are 180° from each other.

Referring to FIG. 4, the first front rib wall 79, the first rear rib wall, the second front rib wall 85 and the second rear rib wall include a plurality of ribs 89 having a rounded surface. The first front rib wall 79 and the first rear rib wall each include two ribs 89 that extend radially outward from the bridge 36 towards the first threaded wall 76. The second front rib wall 85 and the second rear rib wall each include two ribs 89 that extend radially outward from the bridge 36 towards the second threaded wall 82. The ribs 89 have a proximal end (not shown in figure) and a distal end 87. The proximal end is the portion of the ribs 89 that extends from the bridge 36. The distal end 87 is located towards the first threaded 76 or second threaded wall 82. The ribs 89 taper from the distal end 87 to the proximal end, such that the width of the ribs 89 is greater towards the distal end 87 than the proximal end. In the exemplary embodiment, the ribs 89 are positioned such that one of the ribs 89 is located above the second rib 89 and that ribs 89 located on the first front rib wall 79 are mirror images of the ribs 89 located on the second front rib wall 85. The ribs 89 located on the first rear rib wall are mirror images of the ribs 89 located on the second rear rib wall. In other embodiments, there may only be one rib 89 extending from each rib wall or more than two ribs extending from each rib wall. In other embodiments, the ribs 89 may have different dimensions from each other on the same rib wall or between other rib walls. The ribs 89 provide additional strength to the first threaded portion 32 and the second threaded portion 34.

Referring to FIG. 4, the transition portion 22 is generally circular in shape and includes a transition wall 88, a first indent 90 and a second indent opposite from the first indent 90 (not visible in figure), a diameter D3 and a diameter D4. The first indent 90 and the second indent are mirror images that are located approximately 180° from each other. The first indent 90 has portions that are adjacent to the first threaded portion 32 and the second threaded portion 34. The front channel 72 extends from the first threaded portion 32 and the second threaded portion 34 and terminates in the transition portion 22. The second indent has portions that are adjacent to the first threaded portion 32 and the second threaded portion 34. The rear channel 74 (not shown in figure) extends from the first threaded portion 32 and the second threaded portion 34 and terminates in the transition portion 22. The transition wall 88 is adjacent to the first threaded portion 32 and the second threaded portion 34. The transition wall 88 circumscribes the two semi-circular top surfaces, the first top surface 80 and the second top surface 86. The transition wall 88 tapers between the first indent 90 and the second indent and the hollow cylindrical collar 20. The diameter D3 is the distance between the transition wall 88 adjacent to the hollow cylindrical collar 20. The diameter D4 is the distance between two points on the curved portions of the transition wall 88 adjacent to the first threaded portion 32 and the second threaded portion 34. In the exemplary embodiment, the diameter D4 is greater than D3. For example, the diameter D4 may be approximately 33 mm and the diameter D3 may be approximately 30 mm. The diameter D4 is slightly less than the distance between the first threaded wall 76 and the second threaded wall 82 at points that are 180° from each other. In other embodiments, the diameter D4 may be substantially similar than or greater than the distance between the first threaded wall 76 and the second threaded wall 82 at points 180° from each other.

Figure 5:
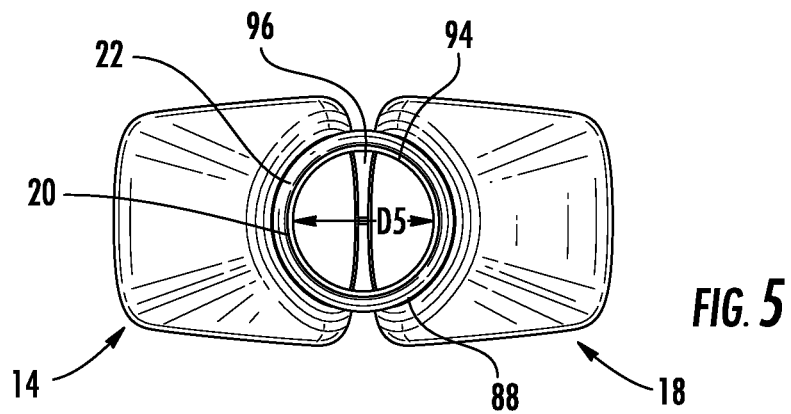
FIG. 5 is a top plan view of the multiple-chamber container of FIG. 1 according to an exemplary embodiment.

Referring to FIG. 4 and FIG. 5, the hollow cylindrical collar 20 includes a collar side wall 92, a rim 94 that defines a substantially circular opening 96, a longitudinal axis 112 and a diameter D5. Any content passing between either the first chamber 14 or the second chamber 18 and the opening 96 must pass through the hollow cylindrical collar 20. The hollow cylindrical collar has a circular cross-section that extends from the transition portion 22 to the rim 94. The collar side wall 92 extends between the rim 94 and the transition portion 22 and is generally cylindrical in shape. The longitudinal axis 112 is located through the center of the opening 96. The diameter D5 is the distance of the opening 96. In the exemplary embodiment, the diameter D5 may be less than the diameter D3. For example, the diameter D5 may be approximately 30 mm and the diameter D3 may be 29 mm. In other embodiments, the hollow cylindrical collar 20 may have an opening 96 and cross-section that are more square or oval in shape. In other embodiments, the diameter D5 may be greater or substantially similar to the diameter D3.

Figure 6A:
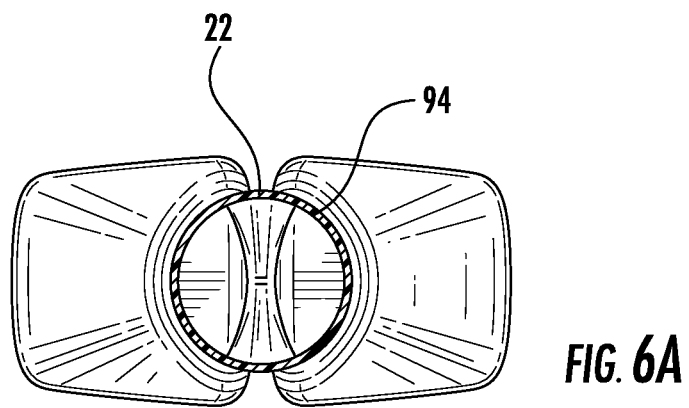
FIG. 6A is a cross-sectional view of the multiple-chamber container of FIG. 1 taken along line 6A-6A in FIG. 4 according to an exemplary embodiment.
Figure 6B:
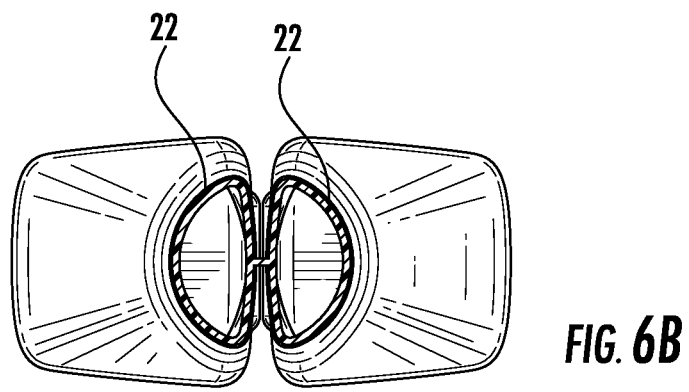
FIG. 6B is a cross-sectional view of the multiple-chamber container of FIG. 1 taken along line 6B-6B in FIG. 4 according to an exemplary embodiment.

Referring to FIG. 6A and FIG. 6B, the transition portion 22 has a plurality of cross-sectional shapes. Referring to FIG. 6A, the transition portion 22 has a circular cross-section that extends between the first indent 90 and the second indent and the hollow cylindrical collar 20 and in FIG. 6B, a cross-section that includes two opposed, hollow D-shaped surfaces that extends between the first indent 90 and the second indent and the first threaded portion 32 and the second threaded portion 34. The transition portion 22 provides a content-tight junction between the first threaded portion 32 of the first tapered neck portion 12 and the hollow cylindrical collar 20. The transition portion 22 also provides a content-tight junction between the second threaded portion 34 of the second tapered neck portion 16 and the hollow cylindrical collar 20.

Figure 7:
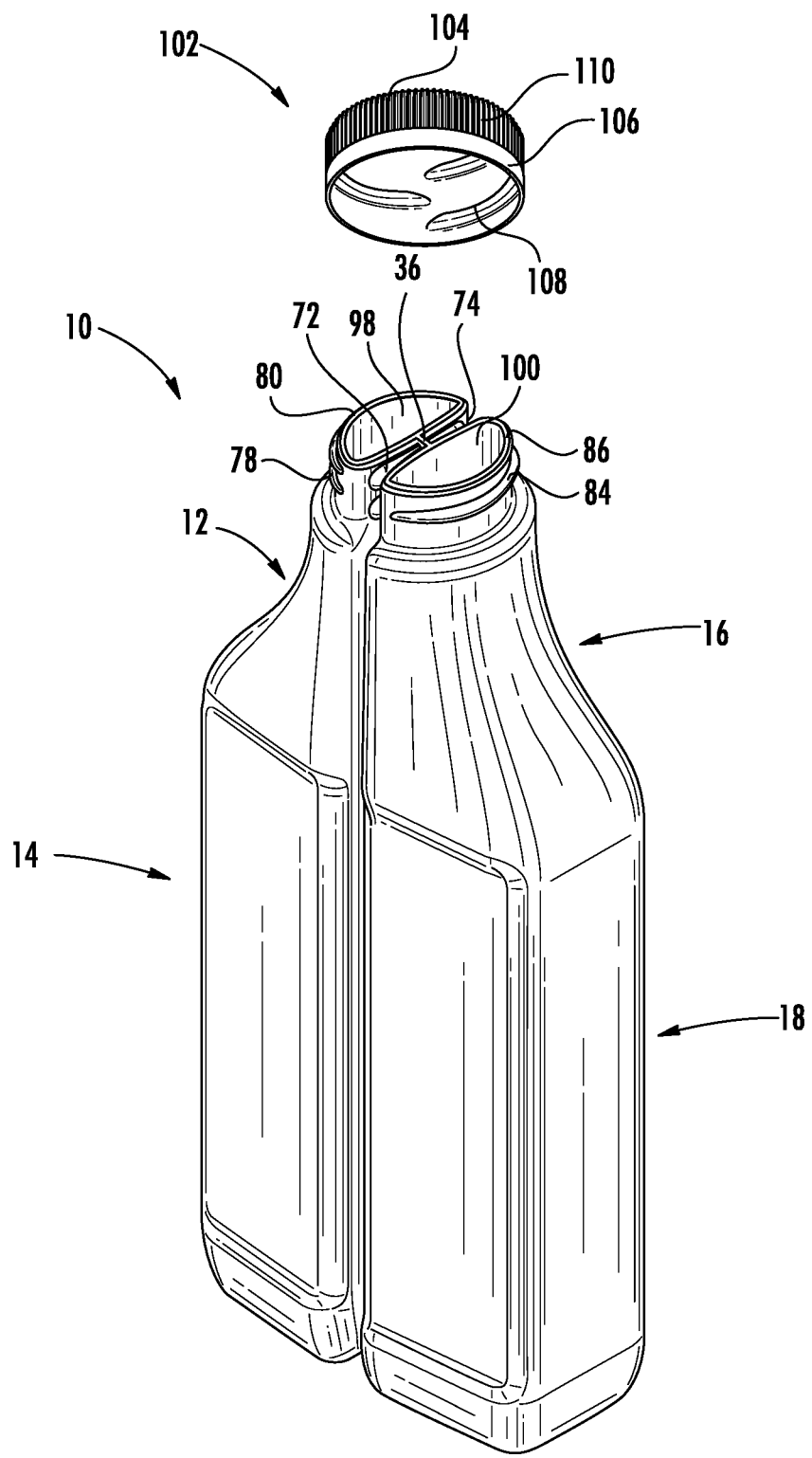
FIG. 7 is a perspective view of the multiple-chamber container of FIG. 1 after the trimming process according to an exemplary embodiment.

Referring to FIG. 7, the multiple-chamber container 10 after the trimming process is shown. The transition portion 22 and the hollow cylindrical collar 20 are removed from the multiple-chamber container 10, exposing the top surface, the first top surface 80 and the second top surface 86 that circumscribe two non-circular openings, a first neck opening 98 and a second neck opening 100. The first top surface 80 and the second top surface 86 lay within a circular plane and are both generally D-shaped. The first top surface 80 defines the first neck opening 98 on the first tapered neck portion 12. The second top surface 86 defines the second neck opening 100 on the second tapered neck portion 16. The first neck opening 98 and the second neck opening 100 are non-circular and are generally D-shaped. The first neck opening 98 permits access into the interior of the first tapered neck portion 12 and the first chamber 14. The second neck opening 100 permits access into the interior of the second tapered neck portion 16 and the second chamber 18. The first neck opening 98 and the second neck opening 100 may be covered with foil or plastic membrane. The first neck opening 98 may be covered with a separate piece or the same piece of foil or plastic membrane as the second neck opening 100. The bridge 36 extends between the first top surface 80 and the second top surface 86. The first neck opening 98 and first top surface 80 are separated from the second neck opening 100 and the second top surface 86 by two gaps, one gap formed by the front channel 72 and the second gap formed by the rear channel 74. The first top surface 80 and the second top surface 86 are coplanar. The first top surface 80 and the first neck opening 98 is a mirror image of the second top surface 86 and the second neck opening 100. In other embodiments, the first top surface 80 and the first neck opening 98 may not be a mirror image of the second top surface 86 and the second neck opening 100, but rather have different dimensions. In other embodiments, the first neck opening 98 and the second neck opening 100 may be more circular or oval in shape. In other embodiments, the neck openings may be of different shapes. For example, the first neck opening 98 may be generally D-shaped and the second neck opening 100 may be generally oval shaped.

Referring to FIG. 7, a cap 102 is shown that includes a circular top 104, a cylindrical skirt 106, an internal thread 108 and projections 110. The cylindrical skirt 106 is formed with the circular top 104. The internal thread 108 of the cap 102 is configured to engage with the first external thread 78 and the second external thread 84. The cap 102 is fully engaged with the multiple-chamber container 10, forming a seal when the internal thread 108 is engaged with the first external thread 78 and the second external thread 84, forcing the circular top 104 against the first top surface 80 and the second top surface 86. The contents of the multiple-chamber container 10 remain in the interior of the first chamber 14, the first tapered neck portion 12, the second chamber 18 and second tapered neck portion 16 until the seal is tampered with or broken. The cap 102 fully engaged with the multiple-chamber container 10 prevents the contents of the container accidentally or unintentionally leaving the interior of either the first chamber 14, the first tapered neck portion 12, the second chamber 18 or second tapered neck portion 16. The cap 102 is configured to provide a user to remove the cap 102 by using a twisting motion to dispense the contents of the multiple-chamber container 10 and the cap 102 may be twisted back on to the multiple-chamber container 10 to form the seal again. The projections 110 provide the user with a better grip of the cylindrical skirt 106 to assist with the twisting motion to remove and replace the cap 102. The cap 102 may also be configured to have the user push in on a designated area to release a tamper band and then apply the twisting motion to remove the cap 102.

Figure 8A:
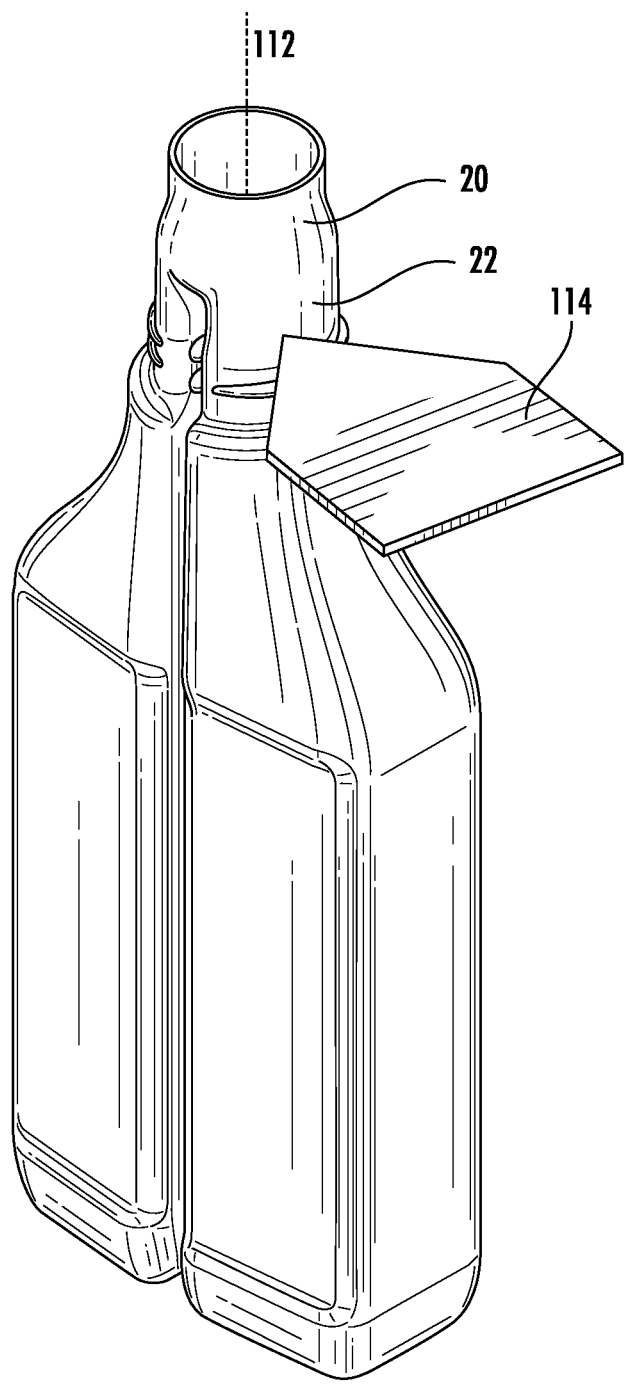
FIGS. 8A-8C illustrates the trimming process of the multiple-chamber container according to an exemplary embodiment.
Figure 8B:
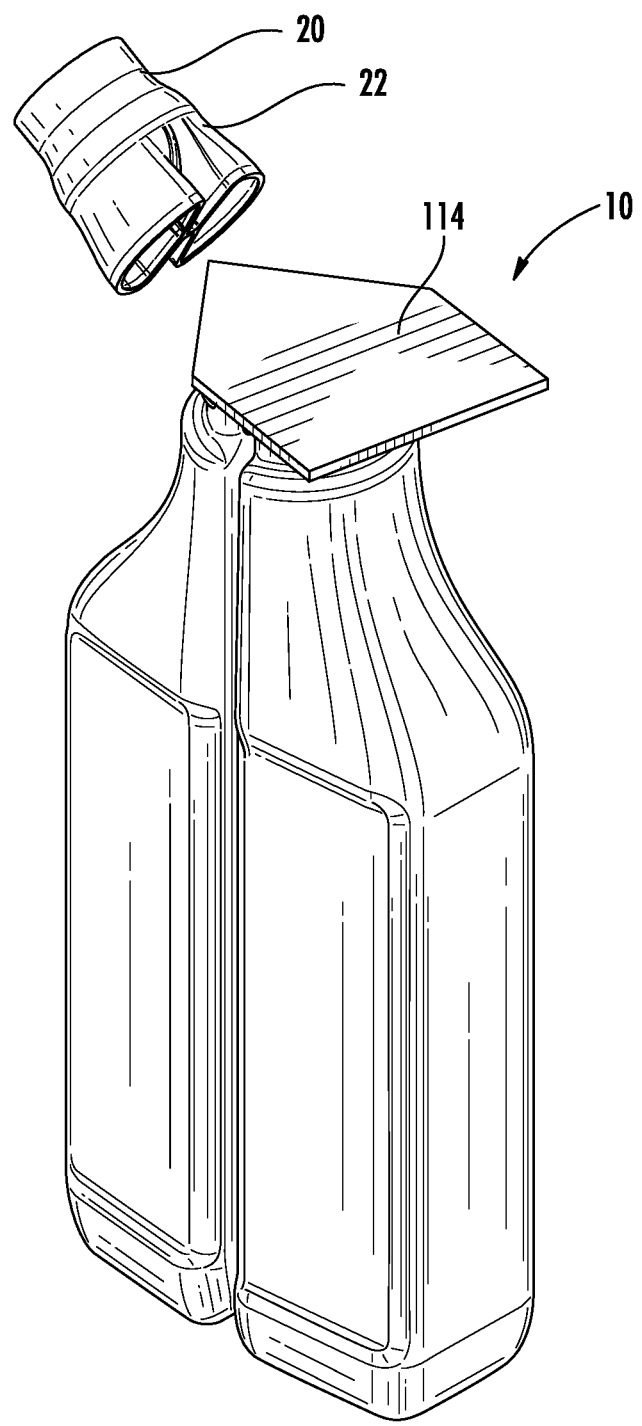
Figure 8C:
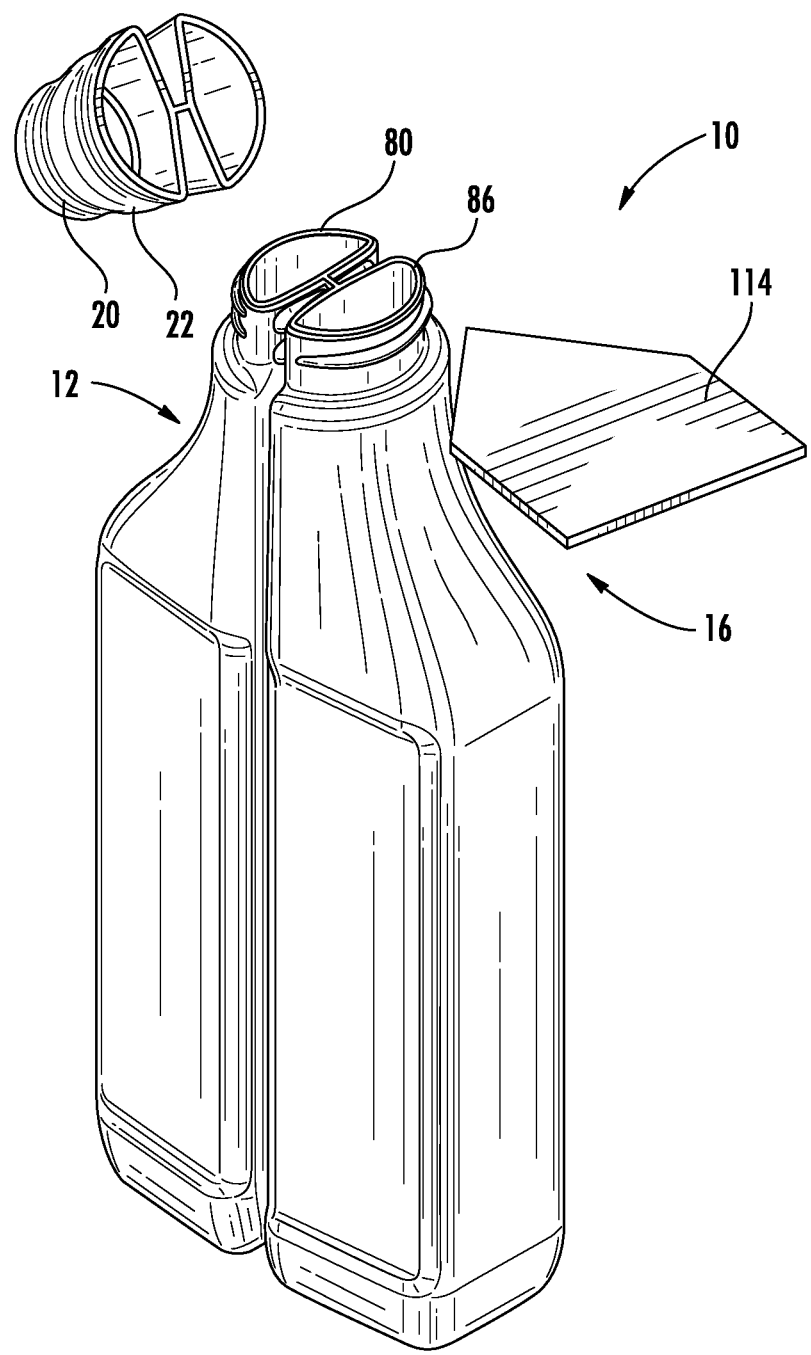
Figure 9A:
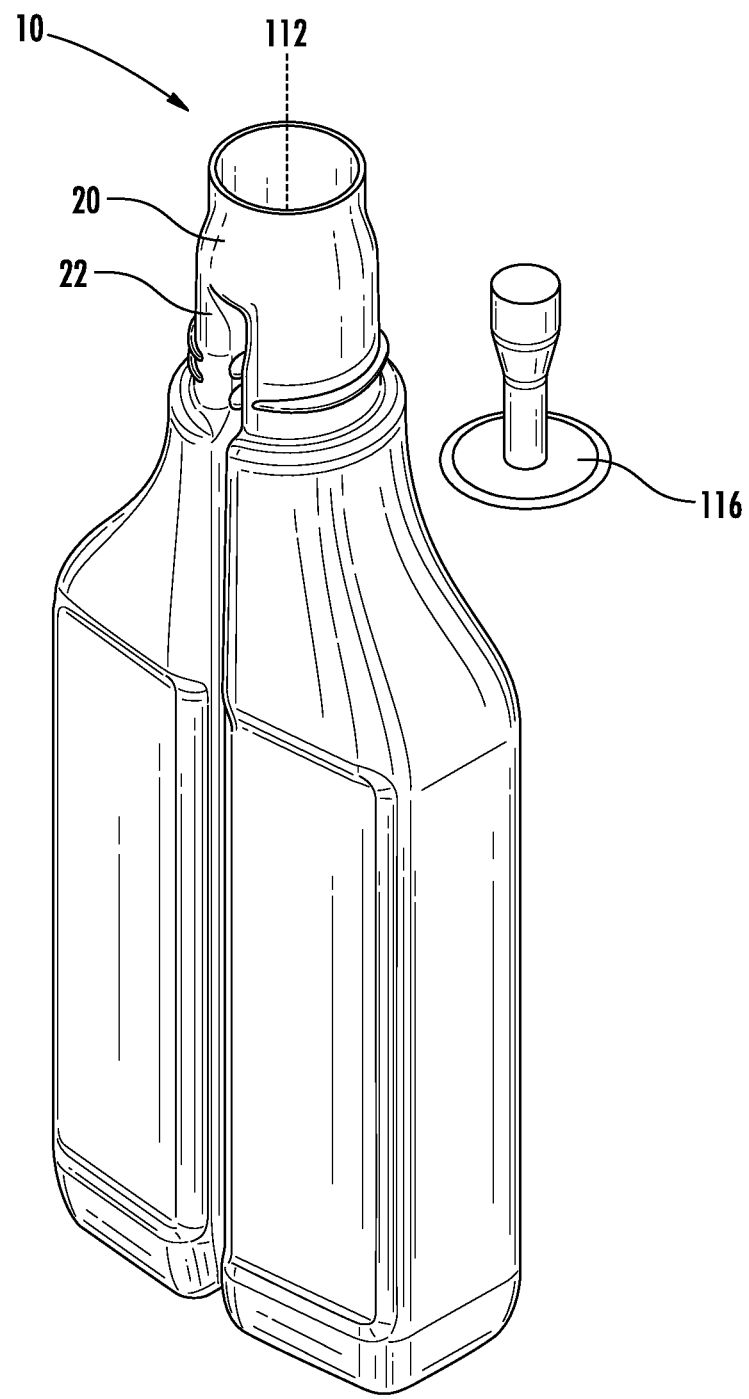
FIGS. 9A-9D illustrates the trimming process of the multiple-chamber container according to another exemplary embodiment.
Figure 9B:
Figure 9C:
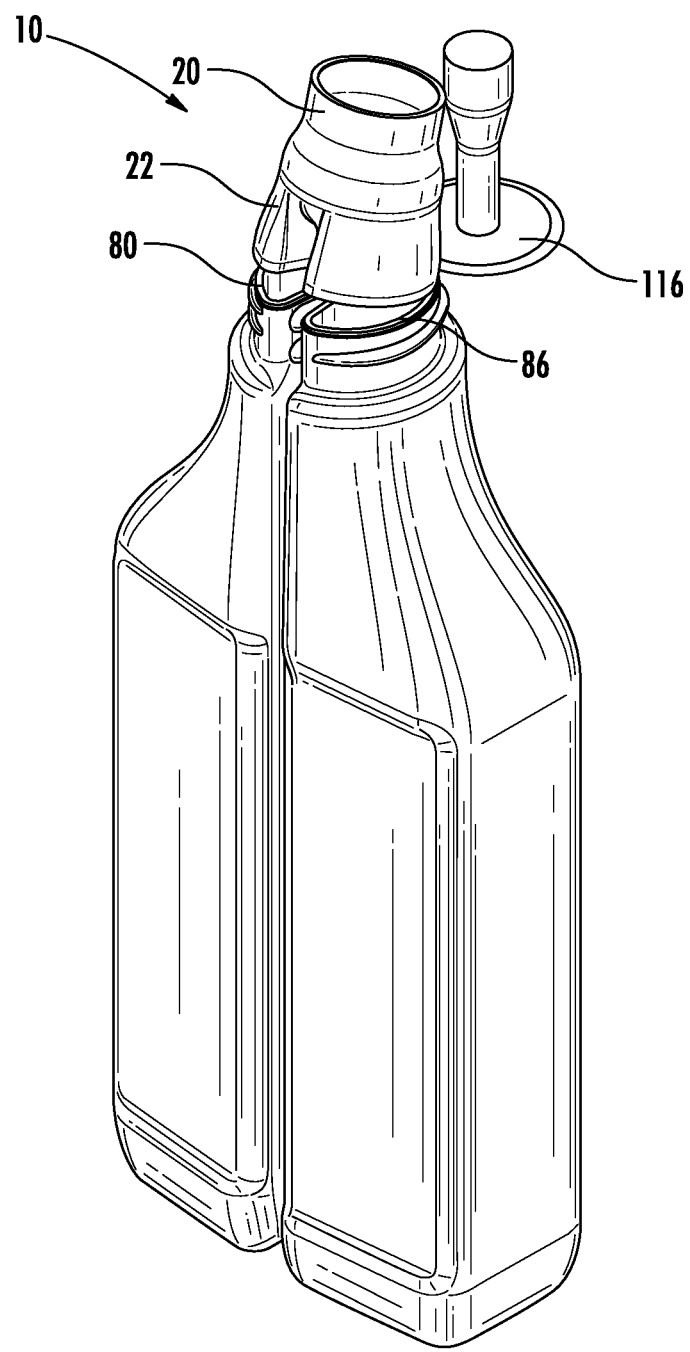
Figure 9D:
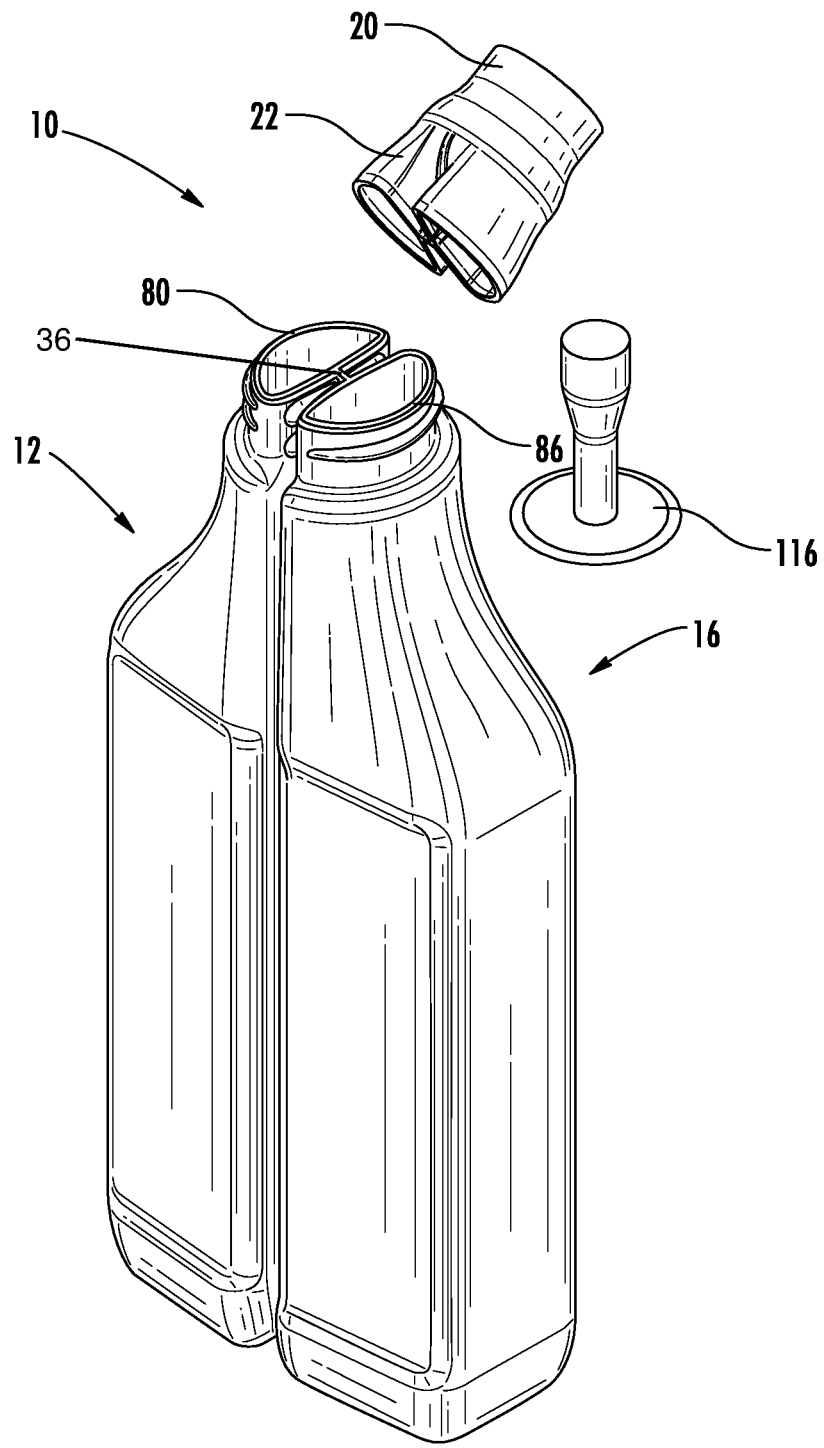

Referring to FIGS. 8A-8C and FIGS. 9A-9D, the trimming processes of removing the hollow cylindrical collar 20 and the transition portion 22 are shown. As shown in FIGS. 8A-8C, one of the steps in a first method to remove the transition portion 22 and the hollow cylindrical collar 20 is to use a blade 114 to cut perpendicular to the longitudinal axis 112 of the hollow cylindrical collar 20 through the transition portion 22. The blade 114 may remove the hollow cylindrical collar 20 and the transition portion 22 in its entirety from the multiple-chamber container 10 by using a single cut or a series of cuts that pass through the entire diameter of the transition portion 22. As shown in FIGS. 9A-9D, one of the steps in a second method to remove the transition portion 22 and the hollow cylindrical collar 20 is to use a round blade 116 that rotates around the multiple-chamber container 10, spiraling inwards towards the bridge 36, cutting perpendicularly to the longitudinal axis 112 of the hollow cylindrical collar 20 through the transition portion 22 until the hollow cylindrical collar 20 and the transition portion 22 are completely separated from the multiple-chamber container 10. As shown in FIGS. 9A and 9B, one of the steps in a third method to remove the transition portion 22 and the hollow cylindrical collar 20 is to use the round blade 116 that rotates around the multiple-chamber container 10, spiraling inwards towards the bridge 36, cutting a portion of the transition portion 22. As shown in FIG. 9C, the round blade 116 then moves in a first linear direction to make a cut from the transition portion 22 towards the bridge 36. After the round blade 116 is completed with the first linear direction cut, the round blade 116 moves 180° around the multiple-chamber container 10 from the first linear direction cut. The round blade 116 then makes a second linear direction cut from the transition portion 22 towards the bridge 36. The round blade 116 continues with the second linear direction cut until the transition portion 22 and the hollow cylindrical collar 20 are completely separated from the multiple-chamber container 10 as shown in FIG. 9D.

Referring to FIGS. 8A-8C and FIGS. 9A-9D, the first top surface 80 that is generally D-shaped, and the second top surface 86 that is generally D-shaped, are exposed once the blade 114 or round blade 116 cuts through the entire transition portion 22, thereby completely separating the transition portion 22 and the hollow cylindrical collar 20 from the multiple-chamber container 10. The first top surface 80 and the second top surface 86 are coplanar with each other and are coincident with one of the cross-sections that fall within a plane and are formed by removing the transition portion 22 and the hollow cylindrical collar 20 from the first tapered neck portion 12 and the second tapered neck portion 16 at one of the cross-sections.

Figure 10:
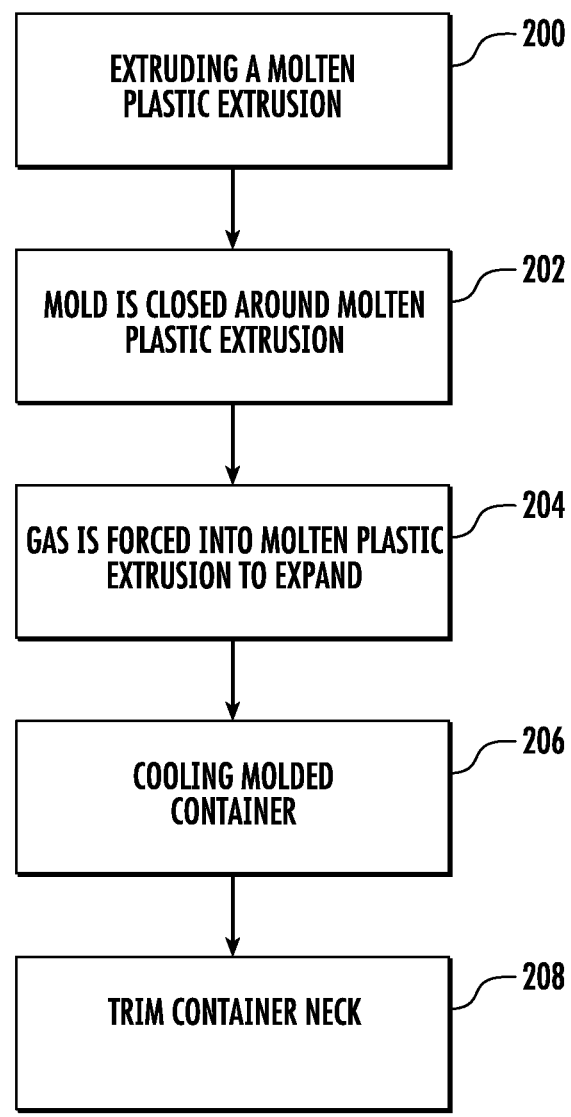
FIG. 10 is a flow-diagram showing a method for forming the multiple-chamber container according to an exemplary embodiment.

Referring to FIG. 10, a method for forming the multiple-chamber container 10 is provided, according to an exemplary embodiment. In one embodiment, at step 200 a molten plastic extrusion is formed from 1 or more different types of thermoplastic materials to produce 1 or more layers of thermoplastic materials. The molten plastic extrusions that are formed from using more than 1 type of thermoplastic material, the adjacent layers of thermoplastic materials are different from each other. The walls forming the first chamber 14, the first tapered neck portion 12, the second chamber 18 and the second tapered neck portion 16, the hollow cylindrical collar 20 and the transition portion 22 are formed from 1 or more layers of thermoplastic materials with at least 5 additional layers of thermoplastic materials. At step 200 the molten plastic extrusion may be formed to produce at least 6 layers of adjacent thermoplastic materials. Each of the adjacent layers of thermoplastic material is different from each other. For example, high density polyethylene, low density polyethylene, polypropylene and polystyrene may be the thermoplastic materials that form the adjacent layers in the multiple-chamber container 10. At step 202, a mold is closed around the molten plastic extrusion. The closed mold includes an interior mold wall that defines an interior shape. The interior shape resembles the shape of the multiple-chamber container 10. At step 204, a gas, such as air, is then forced into the molten plastic extrusion to expand the molten plastic extrusion into contact with the interior mold wall to form a container having an outside shape that resembles the multiple-chamber container 10. At step 204, a pin (not shown) is used through the hollow cylindrical collar 20 during molding to assist the air in expanding the molten plastic extrusion. The outside shape of the multiple-chamber container 10 may be different from the interior shape of the mold by an amount defined by the effects of thermal deformation. Thermal deformation may occur during the forming/molding process. The interior shape of the mold causes the multiple-chamber container 10 to include the first chamber 14, the second chamber 18, the first tapered neck portion 12, the second tapered neck portion 16, the hollow cylindrical collar 20 and the transition portion 22. At step 206, the molded multiple-chamber container 10 that is formed from the molten plastic extrusion is cooled. At step 208, one of the trimming processes discussed above takes place. At step 208, the hollow cylindrical collar 20 and the transition portion 22 is removed from the first tapered neck portion 12 and the second tapered neck portion 16 at the transition portion 22 to produce the multiple-chamber container 10 that has the first top surface 80 and the second top surface 86 that circumscribes the first neck opening 98 and the second neck opening 100 that are co-planar, non-circular openings.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

The present invention provides the ability to form multi-chamber, plastic containers with in excess of 4 to 5 layers using extrusion blow molding. Containers discussed herein may include containers of any style, shape, size, etc. For example, the containers discussed herein may be shaped such that cross-sections taken perpendicular to the longitudinal axis of the container are generally rectangular. However, in other embodiments the sidewall of the containers discussed herein may be shaped in a variety of ways as may be desirable for different applications or aesthetic reasons. In various embodiments, the sidewall of container 10 may include one or more axially extending sidewall sections that are curved radially inwardly or outwardly such that the diameter of the container is different at different places along the axial length of the container, and such curved sections may be smooth continuous curved sections. Container 10 may be of various sizes (e.g., 3 oz., 8 oz., 12 oz., 15 oz., 28 oz, etc.) as desired for a particular application.

What is claimed is:

1. A multiple-chamber container comprising:
    a first chamber comprising:
        a first bottom wall;
        a first front side wall; and
        a first back side wall, the first front side wall and first back side wall being integrally formed with the first bottom wall, the first front side wall and the first back side wall collectively partially defining a rectangular cross-section, the first front side wall and first back side wall terminate at a first tapered neck portion which defines a first opening into the first chamber, the first tapered neck portion including an outer surface having an external thread;
    a second chamber comprising:
        a second bottom wall substantially coplanar with the first bottom wall;
        a second front side wall; and
        a second back side wall, the second front side wall and second back side wall being integrally formed with the second bottom wall, the second front side wall and the second back side wall collectively partially defining a rectangular cross-section, the second front side wall and second back side wall terminate at a second tapered neck portion which defines a second opening into the second chamber, the second tapered neck portion including an outer surface having an external thread;
    a hollow collar defining a third circular opening; and
    a transition portion which provides a content-tight junction between the first and second tapered neck portions and the hollow collar such that the first opening is between the first chamber and the third opening and the second opening is between the second chamber and the third opening.

2. The multiple-chamber container of claim 1, wherein a bridge joins the first chamber to the second chamber, the bridge forming a portion of the first side wall and second side wall.

3. The multiple-chamber container of claim 2, wherein the bridge is integral with the first chamber and second chamber and forms a right angle with the first chamber and second chamber.

4. The multiple-chamber container of claim 1, wherein a shape of the first chamber and the second chamber have the rectangular cross-section near the first bottom wall and second bottom wall and transition to have a square shaped cross-section near the first tapered neck portion and the second tapered neck portion.

5. The multiple-chamber container of claim 4, wherein the square shaped cross-section of the first chamber and the second chamber is 3.5 cm across, from the respective front wall to the respective back wall of each of the first chamber and the second chamber.

6. The multiple-chamber container of claim 1, wherein the first opening defines an oval shape and the second opening defines an oval shape.

7. A multiple-chamber container comprising:
    a first chamber comprising:
        a first bottom wall;
        a first channel wall;
        a first front side wall; and a first back side wall, wherein the first front side wall and first back side wall are integrally formed with the first bottom wall, the first front side wall and the first back side wall collectively having an oval cross-section, wherein the first front side wall and first back side wall terminate at a first tapered neck portion which defines a first opening into the first chamber, the first tapered neck portion including an outer surface having an external thread;

a second chamber comprising:
a second bottom wall substantially coplanar with the first bottom wall;
a second channel wall;
a second front side wall; and
a second back side wall;
wherein the second front side wall and second back side wall are integrally formed with the second bottom wall, the second front side wall and the second back side wall collectively having an oval cross-section, wherein the second front side wall and second back side wall terminate at a second tapered neck portion which defines a second opening into the second chamber, the second tapered neck portion including an outer surface having an external thread;

a hollow collar defining a third opening; and a transition portion which provides a content-tight junction between the first and second tapered neck portions and the hollow collar such that the first opening is between the first chamber and the third opening and the second opening is between the second chamber and the third opening.

8. The multiple-chamber container of claim 7, wherein the first chamber and second chamber are injection molded from a polyethylene thermoplastic.

9. The multiple-chamber container of claim 8, wherein the transition portion circumscribes the first tapered neck portion and second tapered neck portion with a continuous outer surface portion and defines an external thread.

10. The multiple-chamber container of claim 7, wherein the first channel wall and second channel wall couple to form a common wall bridge and separate the first chamber from the second chamber.

11. The multiple-chamber container of claim 7, wherein the first chamber is 12 oz. and the second chamber is 8 oz.

12. The multiple-chamber container of claim 7, further comprising a D-shaped first opening into the first chamber and an oval shaped opening into the second chamber.

13. The multiple-chamber container of claim 7, wherein the first chamber and the second chamber are formed by a molten extrusion that is created by at least 6 layers of adjacent thermoplastic materials.

14. A multiple-chamber container comprising:
a first chamber with a first set of dimensions, comprising:
a first bottom wall;
a first front side wall; and
a first back side wall, the first front side wall and first back side wall are integrally formed with the first bottom wall wherein the first front side wall and first back side wall terminate at a first tapered neck portion, which defines a first opening into the first chamber, the first tapered neck portion including an outer surface having an external thread;

a second chamber with a second set of dimensions, comprising:
a second bottom wall substantially coplanar with the first bottom wall;
a second front side wall; and
a second back side wall, the second front side wall and second back side wall are integrally formed with the second bottom wall wherein the second front side wall and second back side wall terminate at a second tapered neck portion, which defines a second opening into the second chamber, the second tapered neck portion including an outer surface having an external thread;

the first chamber having different dimensions than the second chamber, wherein the first set of dimensions defining the first bottom wall, first front side wall, and first back side wall of the first chamber are different than the dimensions defining the second bottom wall, the second front side wall, the second back side wall of the second set of dimensions, wherein the first front side wall and first back side wall collectively have an oval cross-section, and the second front side wall and second back side wall collectively have a rectangular cross-section;

a hollow collar defining a third circular opening; and a transition portion which provides a content-tight junction between the first and second tapered neck portions and the hollow collar such that the first opening is between the first chamber and the third opening and the second opening is between the second chamber and the third opening.

* * * * *